(12) United States Patent
Hsu

(10) Patent No.: US 10,497,098 B2
(45) Date of Patent: Dec. 3, 2019

(54) DISPLAY APPARATUS AND IMAGE PROCESSING METHOD THEREOF

(71) Applicant: ILI TECHNOLOGY CORP., Hsinchu County (TW)

(72) Inventor: Jung-Chung Hsu, Hsinchu County (TW)

(73) Assignee: ILI TECHNOLOGY CORP., Hsinchu County (TW)

(*) Notice: Subject to any disclaimer, the term of this patent is extended or adjusted under 35 U.S.C. 154(b) by 0 days.

(21) Appl. No.: 15/927,101

(22) Filed: Mar. 21, 2018

(65) Prior Publication Data

US 2019/0027112 A1 Jan. 24, 2019

Related U.S. Application Data

(60) Provisional application No. 62/535,233, filed on Jul. 21, 2017.

(30) Foreign Application Priority Data

Sep. 27, 2017 (TW) .............................. 106133145 A
Nov. 13, 2017 (TW) .............................. 106139124 A

(51) Int. Cl.
G06T 5/00 (2006.01)

(52) U.S. Cl.
CPC ......... G06T 5/002 (2013.01); *G09G 2340/14* (2013.01)

(58) Field of Classification Search
None
See application file for complete search history.

(56) References Cited

U.S. PATENT DOCUMENTS

2012/0092344 A1* 4/2012 Cheng ................... G06T 11/203
345/467
2013/0027285 A1 1/2013 Inada
(Continued)

FOREIGN PATENT DOCUMENTS

JP 2004004830 1/2004
JP 2008216894 9/2008
TW M558448 4/2018

OTHER PUBLICATIONS

"Office Action of Taiwan Counterpart Application", dated May 15, 2018, p. 1-p. 3.
(Continued)

*Primary Examiner* — Yanna Wu
(74) *Attorney, Agent, or Firm* — JCIPRNET

(57) ABSTRACT

A display apparatus and an image processing method thereof are provided. The display apparatus includes a display panel and a processor. The display panel has at least one arc-shape. The processor is configured to: receive position and shape information of the arc-shape of the display panel; adjust a display data according to the position and shape information to generate an adjusted display data, set an anti-aliasing block with a plurality of weighting values; scan the adjusted display data by the anti-aliasing block, and find at least one first weighting value and at least one second weighting value corresponding to a first gray level and a second gray level; operate an arithmetic operation by a grey level of a scanned pixel or a scanned sub-pixel with the first or second weighting value, and adjust the grey level of the scanned pixel or the scanned sub-pixel according to an operation result.

21 Claims, 7 Drawing Sheets

(56) References Cited

U.S. PATENT DOCUMENTS

2017/0219895 A1     8/2017   Yu et al.
2017/0330500 A1    11/2017   Yoon et al.

OTHER PUBLICATIONS

"Office Action of Japan Counterpart Application", dated Jun. 25, 2019, p. 1-p. 2.

* cited by examiner

… (1)

DISPLAY APPARATUS AND IMAGE PROCESSING METHOD THEREOF

CROSS-REFERENCE TO RELATED APPLICATION

This application claims the priority benefits of U.S. provisional application Ser. No. 62/535,233, filed on Jul. 21, 2017, Taiwan application serial no. 106133145, filed on Sep. 27, 2017, and Taiwan application serial no. 106139124, filed on Nov. 13, 2017. The entirety of each of the above-mentioned patent applications is hereby incorporated by reference herein and made a part of this specification.

BACKGROUND OF THE INVENTION

Field of the Invention

The invention relates to a display apparatus and image processing method thereof, and particularly relates to an image processing method configured to generate a display image having an arc-shape.

Description of Related Art

With the evolution of electronic technology, electronic apparatuses have become important tools in people's lives. Providing a high-quality screen display function is also an indispensable function of today's electronic apparatuses. In today's display panels, to render a more lively and vivid display screen, the shape of a display screen provided by the electronic apparatus, is no longer a dull rectangular set up. In order to generate display screens having arc-shapes, conventional technology often make use of shading stickers to shade the display screen outside the arc-shape, or generate display screens having arc-shapes by cutting the display panel into the shape of the arc-shape. However, for different customer needs, these conventional means will need to customize the display panel or design of the shading stickers. Furthermore, in the display screen rendered by conventional technology, a serrated phenomenon often appears in a portion of the arc-shape, reducing the quality of the display.

SUMMARY OF THE INVENTION

The invention provides a display apparatus and image processing method thereof, which may effectively reduce a serrated phenomenon of an arc-shape of a display screen.

The display apparatus provided by the invention includes a display panel and a processor. The display panel has at least one arc-shape. The processor coupled to the display panel is configured to: receive position and shape information of at least one arc-shape of the display panel; receive a display data, adjust the display data according to the position and shape information to generate an adjusted display data; set an anti-aliasing block, wherein the anti-aliasing block has a plurality of weighting values; and scan the adjusted display data by the anti-aliasing block according to the position and shape information, and find at least one first weighting value of the weighting values corresponding to a first gray level, and find at least one second weighting value of the weighting values corresponding to a second gray level, operate an arithmetic operation by a gray level of a scanned pixel or a scanned sub-pixel with at least one first weighting value or at least one second weighting value to generate an operation result, and adjust the gray level of the scanned pixel or the scanned sub-pixel according to the operation result.

The image processing method of the invention includes: recording position and shape information of at least one arc-shape of a display panel; receiving display data, adjusting the display data according to the position and shape information to generate the adjusted display data; setting an anti-aliasing block, wherein the anti-aliasing block has a plurality of weighting values; and scanning the adjusted display data by the anti-aliasing block according to the position and shape information, and finding at least one first weighting value of the weighting values corresponding to a first gray level, and finding at least one second weighting value of the weighting values corresponding to a second gray level, operating an arithmetic operation by a gray level of a scanned pixel or a scanned sub-pixel with at least one first weighting value or at least one second weighting value to generate an operation result, and adjusting the gray level of the scanned pixel or the scanned sub-pixel according to the operation result.

Based on the above, the invention provides an anti-aliasing block for scanning a display image, and operates an arithmetic operation through a weighting value on the anti-aliasing block and a grey level of a scanned pixel or a grey level of a scanned sub-pixel, to passivate the sharpness of the pixels or the sub-pixels on a display boundary of an arc-shape in the display image, thereby, achieving an anti-aliasing effect and improving the display quality of the image.

To make the above features and advantages of the invention more comprehensible, several embodiments accompanied with drawings are described in detail as follows.

DETAILED DESCRIPTION OF DISCLOSED EMBODIMENTS

Figure 1:
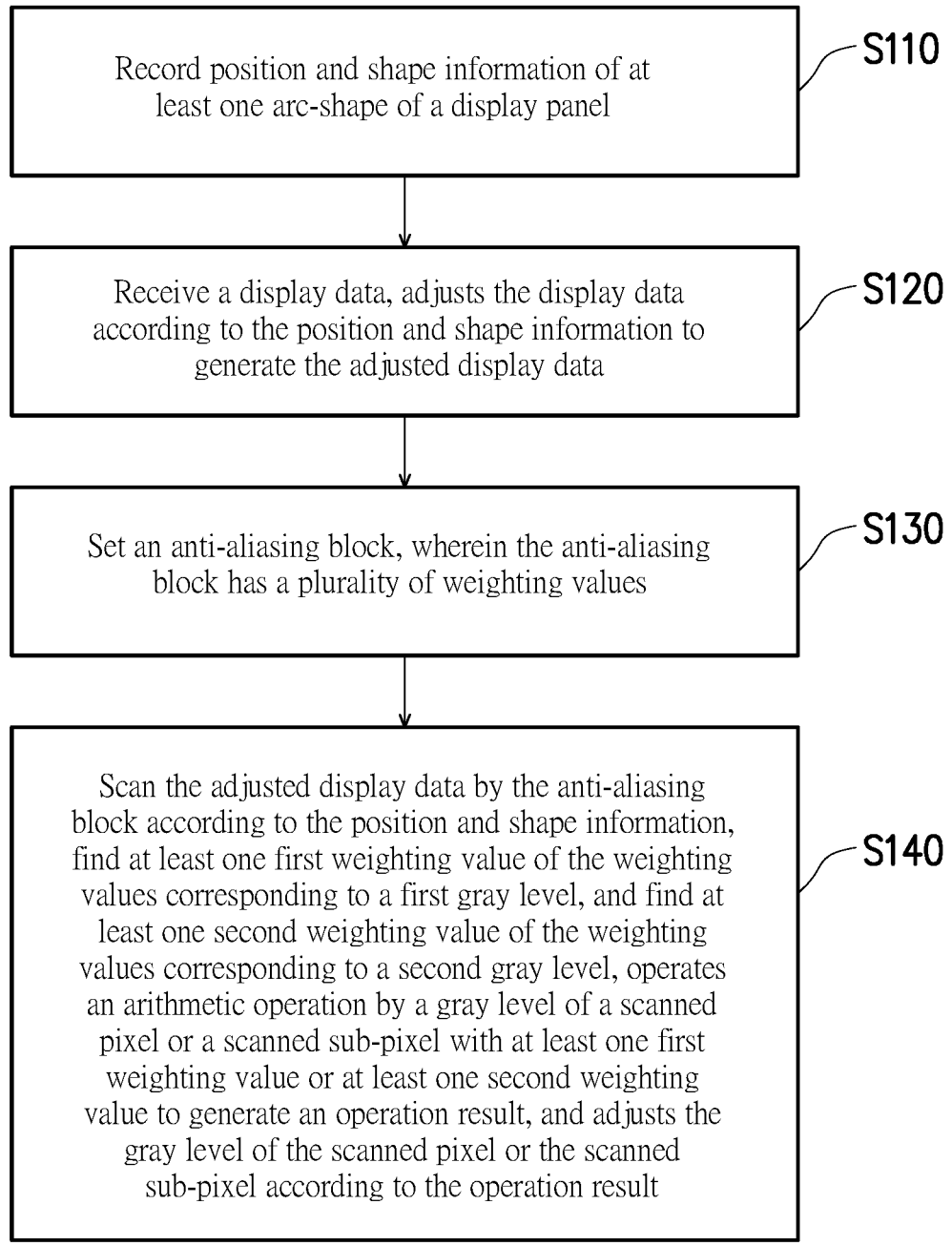
FIG. 1 illustrates a flow chart of an image processing method of an exemplary embodiment of the invention.
Figure 8:
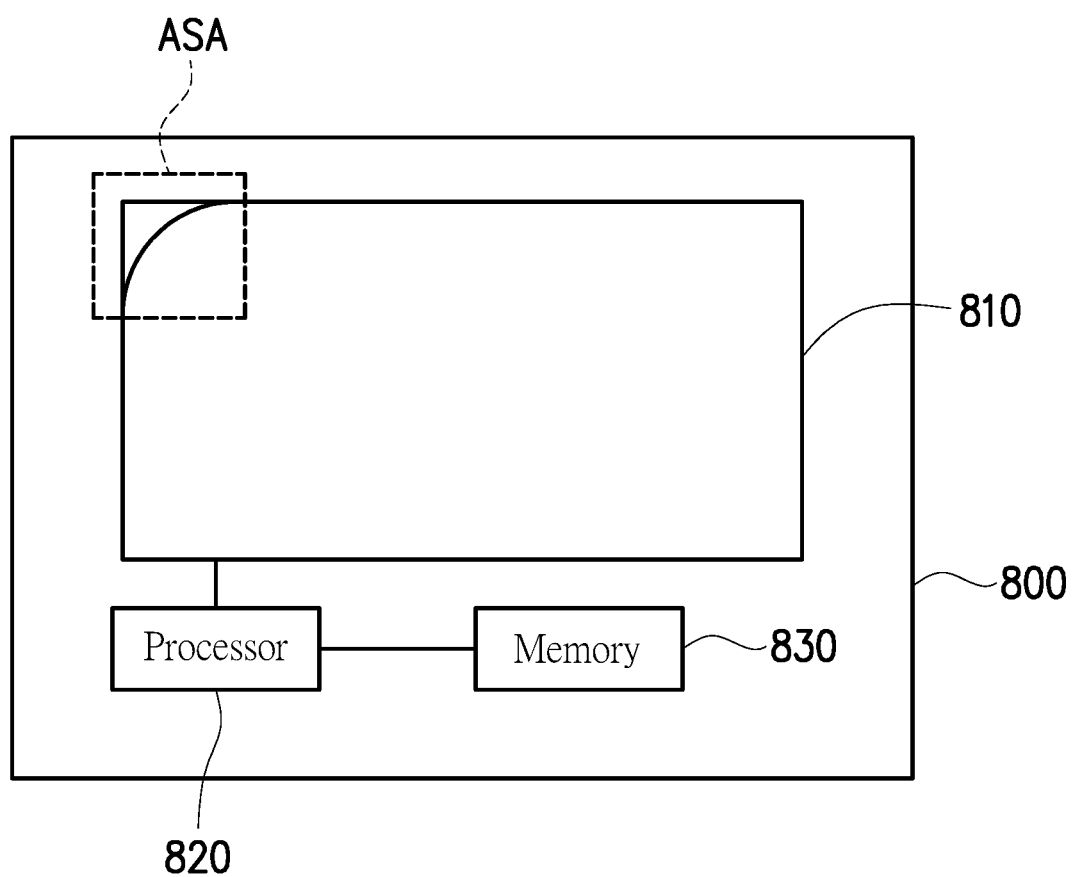
FIG. 8 illustrates a schematic view of a display apparatus of an exemplary embodiment of the invention.

Referring to FIG. 1 and FIG. 8, FIG. 1 illustrates a flow chart of an image processing method of an exemplary embodiment of the invention, and FIG. 8 illustrates a schematic view of a display apparatus of an exemplary embodiment of the invention. A display apparatus 800 includes a display panel 810, a processor 820, and a memory 830. The display panel 810 has one or a plurality of arc-shapes ASA. The processor 820 is coupled to the display panel 810, and configured to execute a plurality of steps as illustrated in FIG. 1. The memory 830 may be used to store position and shape information of the arc-shapes ASA, and provide the processor 820 for reading.

The processor 820 may be a microprocessor having arbitrary computing ability. Alternatively, the processor 820 may be designed through a hardware description language (HDL) or any other design methods of digital circuit that are familiar to people of ordinary skills in the art, and a hardware circuit may be achieved through a field programmable gate array (FPGA), a complex programmable logic device (CPLD) or an application-specific integrated circuit (ASIC).

The memory 830 may be any type of volatile or non-volatile memory, with no fixed limits.

In addition, the arc-shape ASA may be occurred on any position of the display panel 810, and the arc-shape ASA of the drawing occurring on the upper right corner of the display panel 810 is only an illustrative example that is not intended to limit the invention.

Regarding the flow chart of FIG. 1, step S110 records the position and shape information of the arc-shape on the display panel. In an exemplary embodiment of the invention, the quantity of the arc-shapes ASA on the display panel 810 may be one or more, with no limit on the quantity. Regarding the position of the arc-shape ASA on the display panel 810, a coordinate system may be defined on the display panel, and the position of the arc-shape ASA may be defined by coordinate range of the arc-shape ASA. Regarding the shape of the arc-shape ASA, a bitmap may be established by a pixel or a sub-pixel occurring in the range of the arc-shape ASA on the corresponding display panel. The shape of the arc-shape ASA may be recorded by a method of recording a bit outside the arc-shape ASA as a first logic level, and recording a bit inside the arc-shape ASA as a second logic level (the first logic level and the second logic level complements each other), wherein the display panel 810 has a plurality of pixels, and each pixel may be made up of a plurality of sub-pixels. The plurality of sub-pixels included in the single pixel may be used to display colors of different wavelengths, for example, one pixel may include three sub-pixels, which may be respectively used to generate the display effects of red color, green color and blue color.

Of course, an exemplary embodiment of the invention may also directly establish the bitmap for all pixels or all sub-pixels on the display panel 810, without a need to establish the above-mentioned coordinates system, and respectively records the position and shape information of the arc-shape ASA by different logic levels through the bitmap.

In addition, the recording method of the above-mentioned bitmap is only an illustrative example that is not intended to limit the scope of the invention. It is well known to people of ordinary skills in the art that the method of recording shape and position of an object through digital data may be applied to the invention.

On the other hand, the position and shape information of the arc-shape ASA may be recorded in a storage media, for example, any form of the memory 830, with no fixed limits.

Figure 2:
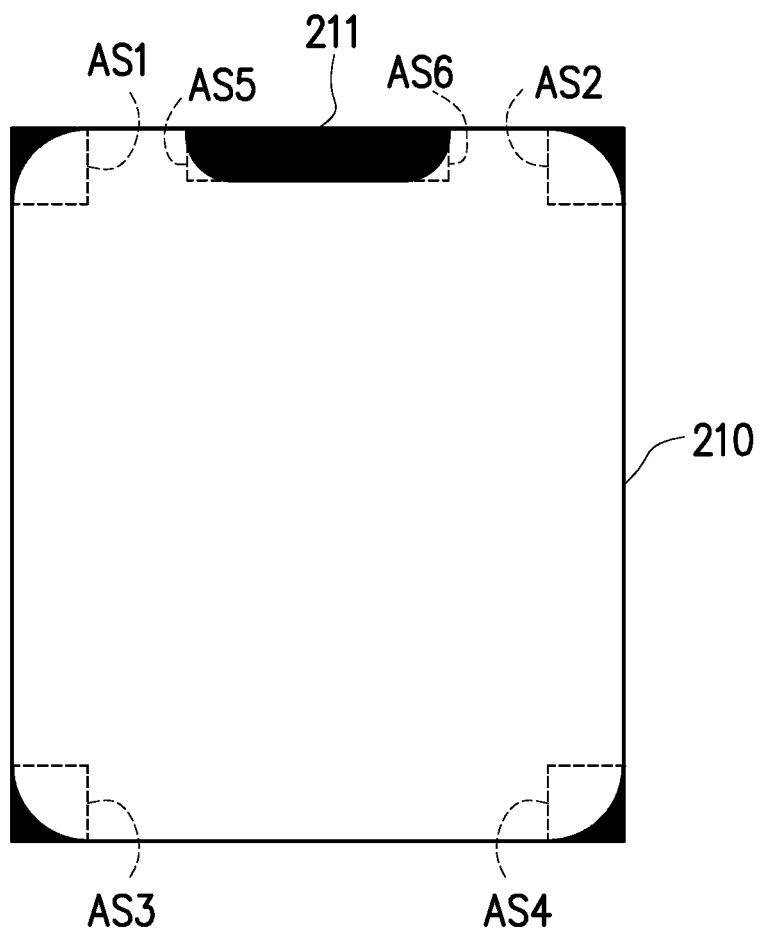
FIG. 2 illustrates a schematic view of shape and position of an arc-shape of an exemplary embodiment of the invention.
Figure 3:
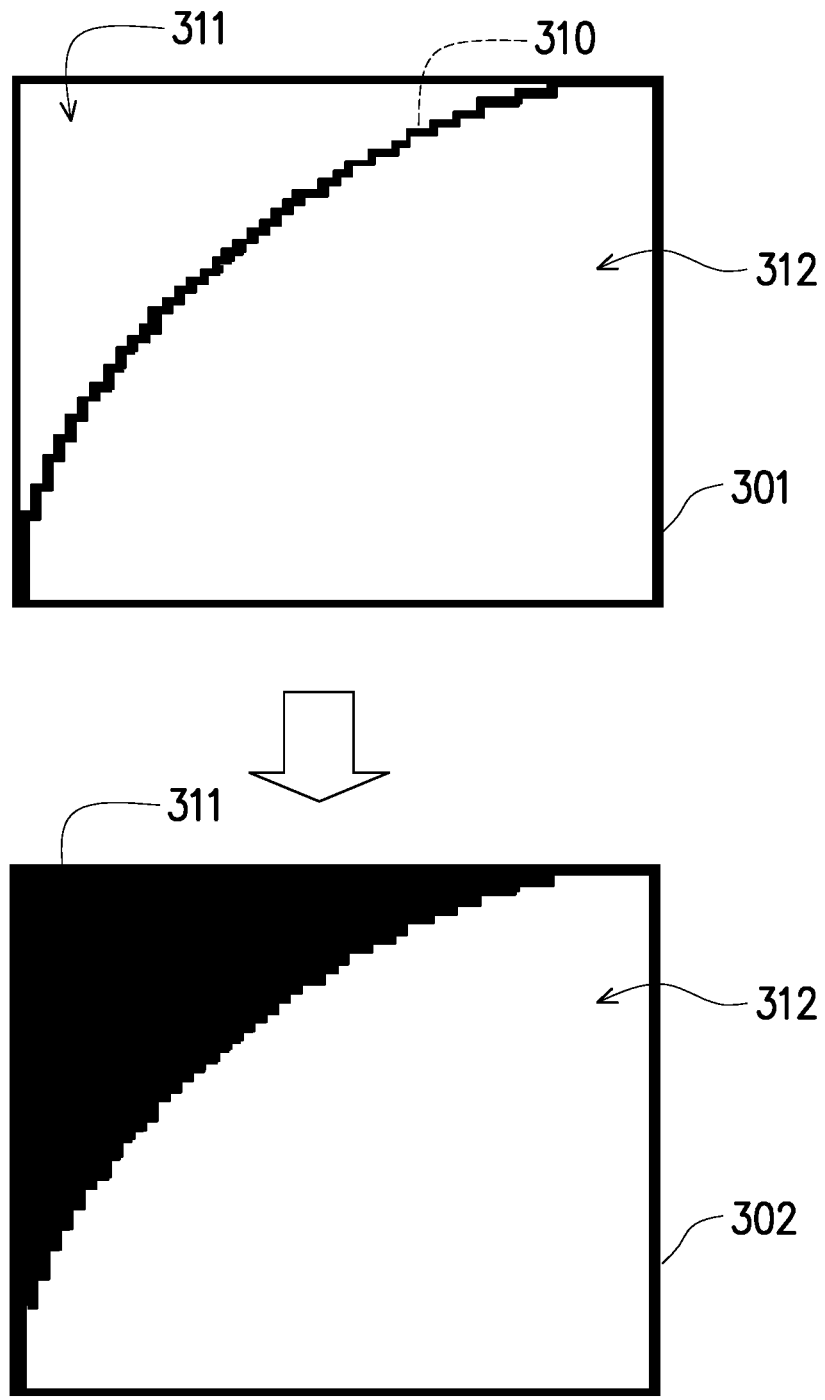
FIG. 3 illustrates a schematic view of an adjustment method of a display data of an exemplary embodiment of the invention.

After that, step S120 receives the display data, and adjusts the display data according to the position and shape information of the arc-shape ASA, and generates the adjusted display data. To describe in detail, in an exemplary embodiment of the invention, a display boundary of the arc-shape ASA may be learned according to the position and shape information of the arc-shape ASA. After that, in the display data, a pixel gray level corresponding to the outside of the display boundary is adjusted to, for example, a second grey level of a first color (for example, black color) grey level, and in the display data, a pixel grey level corresponding to the inside of the display boundary is maintained as a normal (not a first color, and not a black color) first grey level, so as to generate the adjusted display data. Of course, in other exemplary embodiment of the invention, the second grey level also does not necessarily need to be a black grey level, and may be set to other types of grey level of any colors, wherein, the second grey level can be set to a color gray level that may be clearly separated from the first gray level. Of course, the sub-pixels in each pixel, for example, red color (R), green color (G), blue color (B) or other colors, may also be adjusted respectively. Using a red (R) sub-pixel as an example, in the display data, the sub-pixel gray level corresponding to the outside of the display boundary is adjusted to, for example, the second grey level of the first color (for example, light red color) grey level, and in the display data, the sub-pixel grey level corresponding to the inside of the display boundary is maintained as a normal (not a first color, and not a light red color) first grey level, so as to generate the adjusted display data. Referring to FIG. 2 and FIG. 3 at the same time, FIG. 2 illustrates a schematic view of shape and position of an arc-shape of an exemplary embodiment of the invention, and FIG. 3 illustrates a schematic view of an adjustment method of a display data of an exemplary embodiment of the invention. In FIG. 2, the display panel 210 has a plurality of arc-shapes AS1 to AS6, wherein the arc-shapes AS1 to AS4 may be respectively disposed on four corners of the display panel 210, and the arc-shapes AS5 and AS6 may also be generated on an edge of a groove 211 on the display panel 210. In an exemplary embodiment of the invention, the arc-shapes AS1 to AS4 are convex arc-shapes, and arc-shapes AS5 and AS6 are concave arc-shapes. It is worth noting that in an exemplary embodiment of the invention, the quantity and shape of the arc-shapes on the display panel 210 do not have fixed limits, and the display panel 210 may be a display panel of any form of abnormity cutting.

The position and shape of the arc-shapes AS1 to AS6 may be obtained from the position and shape information thereof. Moreover, as shown in FIG. 3, part of an image data corresponding to the arc-shapes AS1 to AS6 may be obtained in the image data according to the position and shape information. In FIG. 3, part of an image data 301 is, for example, the image data corresponding to the arc-shape AS1. The display boundary 310 corresponding to the boundary of the arc-shape AS1 may be obtained according to the position and shape information of the arc-shape AS1. Moreover, the adjusted display data (such as, a partially adjusted display data 302) may be obtained through a pixel grey level outside 311 of the display boundary 310 which is, for example, a second grey level of a black grey level, and through a grey level inside 312 of the display boundary 310 which is maintained to be an original normal grey level (a first grey level). Of course, the adjusted display data (such as, the partially adjusted display data 302) may also be obtained through a sub-pixel grey level outside 311 of the display boundary 310 which is, for example, a second grey level of a light red grey level, and through a grey level inside 312 of the display boundary 310 which is maintained to be the original normal grey level (a first grey level).

Figure 4:
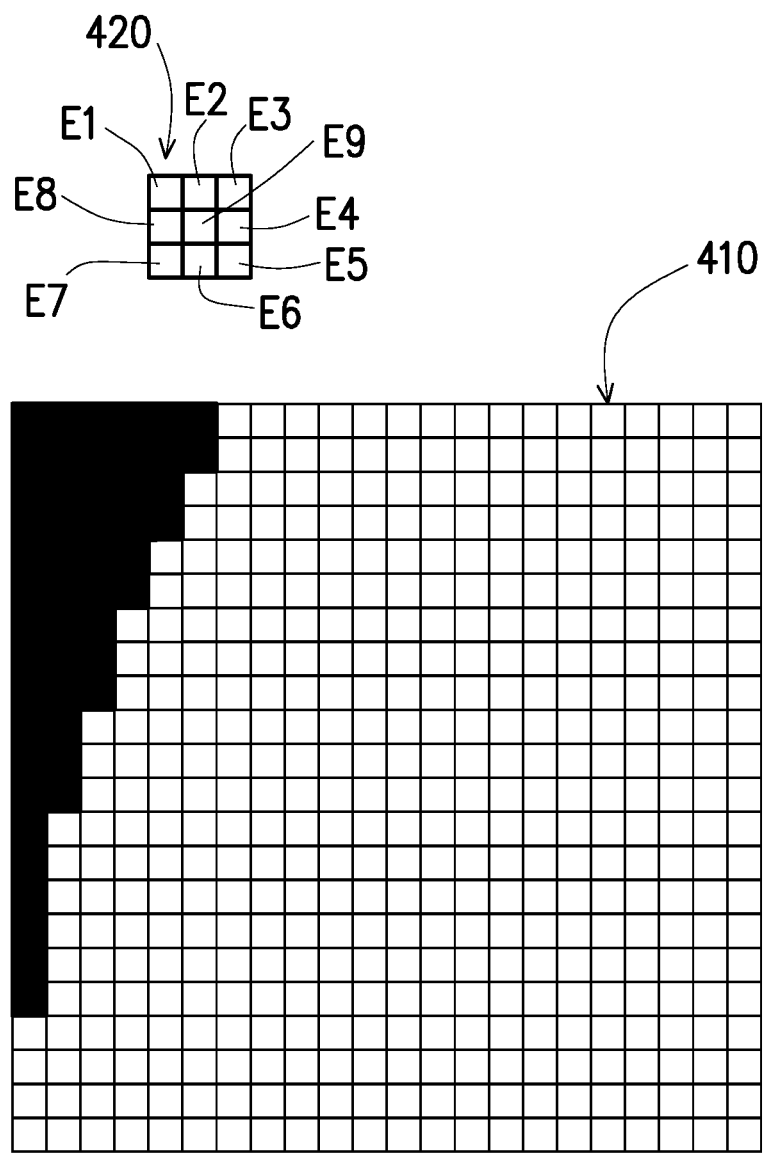
FIG. 4 and FIG. 5 illustrate schematic views of scanning an anti-aliasing block of an exemplary embodiment of the invention.
Figure 5:
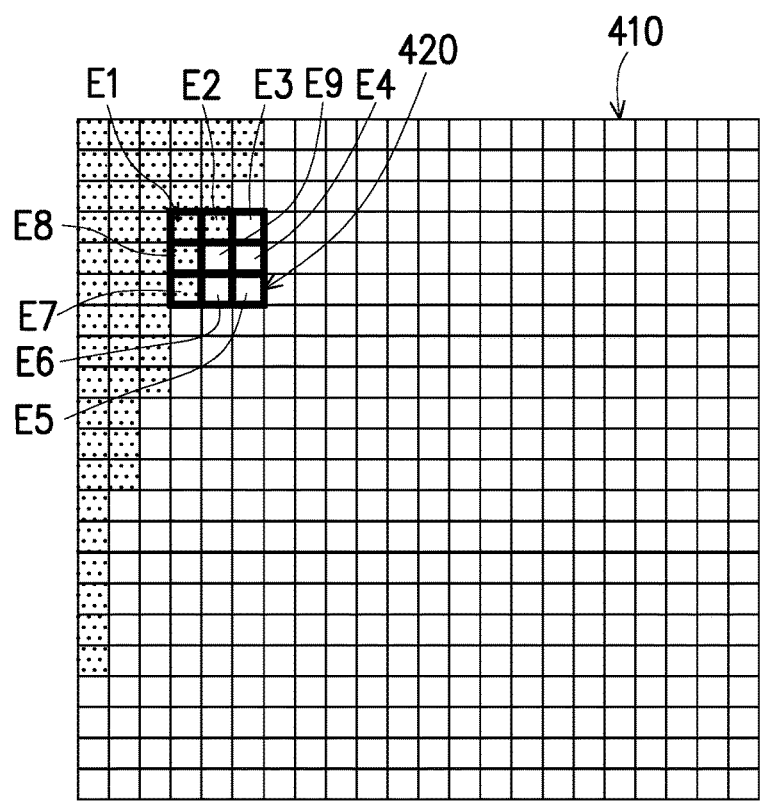
Figure 6A:
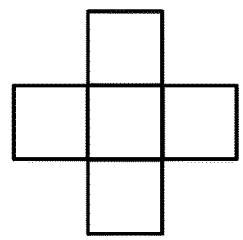
FIG. 6A to FIG. 6E respectively, illustrate schematic views of many types of different embodiments of the anti-aliasing block of the invention.
Figure 6B:
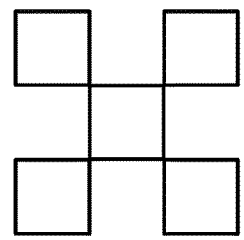
Figure 6C:
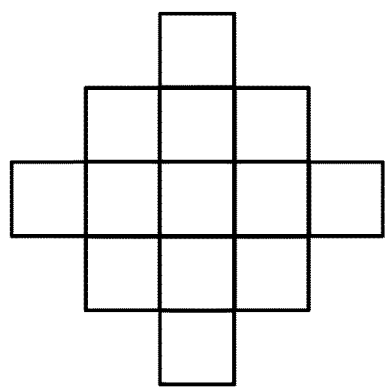
Figure 6D:
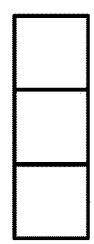
Figure 6E:
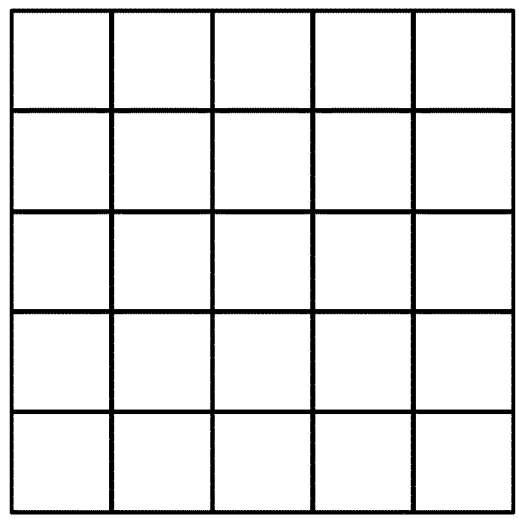

After that, please refer to FIG. 1, FIG. 4 and FIG. 5 together, wherein FIG. 4 and FIG. 5 illustrate schematic views of scanning an anti-aliasing block of an exemplary embodiment of the invention. Continuing to step S120, after obtaining the adjusted display data, step S130 sets an anti-aliasing block, wherein the anti-aliasing block has a plurality of elements, and each element has a weighting value, wherein step S130 sets the element in the center of the anti-aliasing block as the center weighting value, and sets the surrounding elements of the center elements respectively as a plurality of surrounding weighting values. The sum of the center weighting values and the surrounding weighting values may be equal to a reference value, for example, equal to 1. Referring to FIG. 4, an anti-aliasing block 420 has nine elements E1 to E9, wherein the elements E1 to E8 are surrounding elements, and element E9 is a center element. Corresponding to the anti-aliasing block 420, the weighting value of the anti-aliasing block 420 may be set as shown in Table 1:

TABLE 1

| $1/16$ | $2/16$ | $1/16$ |
|---|---|---|
| $2/16$ | $4/16$ | $2/16$ |
| $1/16$ | $2/16$ | $1/16$ | wherein, the weighting values of the elements E1 to E9 are respectively, $1/16$, $2/16$, $1/16$, $2/16$, $1/16$, $2/16$, $1/16$, $2/16$ and $4/16$.

Of course, the values of the weighting values in Table 1 are only examples for explanation and are not intended to limit the scope of the invention. In an exemplary embodiment of the invention, the center weighting value is greater than the surrounding weighting value, and in other embodiments of the present invention, the center weighting value also may not be greater than the surrounding weighting value. The value of each center weighting value and surrounding weighting value may be adjusted moderately according to the actual situation and the strength of the anti-aliasing effect to be generated, without any fixed limits.

In step S140, the anti-aliasing block 420 scans the adjusted display data 410 according to the position and shape information, wherein, the scanning action may align the center element E9 of the anti-aliasing block 420 with each scanned pixel or sub-pixel in the adjusted display data 410 according to a fixed sequence and direction, and finds one or a plurality of elements in the anti-aliasing block 420 corresponding to a pixel or a sub-pixel gray level as the first gray level, and finds the first weighting value of one or a plurality of the above-mentioned elements, and finds one or a plurality of elements in the anti-aliasing block 420 corresponding to a pixel or sub-pixel gray level as the second grey level, and finds one or a plurality of a second weighting value of the above-mentioned elements, and again, operates a first arithmetic operation on the first weighting value or the second weighting value, and operates a second arithmetic operation on the gray level of the scanned pixel or the sub-pixel and the result of the first arithmetic operation to obtain a second arithmetic operation result, and adjusts the grey level of the scanned pixel or the sub-pixel through the second arithmetic operation result, to achieve an anti-aliasing display effect.

As shown in FIG. 5, the elements E1, E2, E7 and E8 of the anti-aliasing block 420 correspond to the pixels or the sub-pixels of the second gray level. It can be learned that the second weighting values of the elements E1, E2, E7, and E8 are respectively, $1/16$, $2/16$, $1/16$ and $2/16$. In addition, the elements E3 to E6 and E9 of the anti-aliasing block 420 correspond to the pixels or the sub-pixels of the first grey level. It can be learned that the first weighting values of the elements E3 to E6 and E9 are respectively, $1/16$, $2/16$, $1/16$, $2/16$ and $4/16$.

In an exemplary embodiment of the invention, the sum of the first weighting values may be calculated to obtain a first operation result equal to $1/16+2/16+1/16+2/16+4/16=10/16$. Again, by multiplying the gray level (for example, equal to 255) of the scanned pixel or sub-pixel by the first operation result ($=10/16$), the adjusted gray level$=255\times10/16=159$ may be obtained.

In another exemplary embodiment of the invention, the sum of the second weighting values, equal to $1/16+2/16+1/16+2/16=6/16$ may also be calculated, and the first operation result ($=1-6/16=10/16$) is obtained by subtracting $6/16$ from the reference value ($=1$). After that, by multiplying the gray level (for example, equal to 255) of the scanned pixel or sub-pixel by the first operation result ($=10/16$), the adjusted gray level$=255\times10/16=159$ may be obtained.

It can be deduced from the above that the grey level of the scanned pixel or the sub-pixel may be adjusted from 255 to 159 according to the above calculation, thereby, generating the anti-aliasing effect.

The above scanning action may be operated for the complete adjusted display data, and may also set the scanning region for the range corresponding to the arc-shapes in the adjusted display data, and operated only on the scanning region that is set.

The rectangle of the above anti-aliasing block is 3×3, is only an example, wherein, referring to FIG. 6A to FIG. 6E, FIG. 6A to FIG. 6E are respective schematic views of many types of different embodiments of the anti-aliasing block of the invention, wherein, the shape of the anti-aliasing block may be any polygons, and the measurements thereof are also not fixed in its limitations. In an exemplary embodiment of the invention, the measurement and shape of the anti-aliasing block, and the weighting values thereof that are set by the elements, may be set according to the anti-aliasing intensity value. The anti-aliasing intensity value may be set by an engineer, or may also be input by a user through an input interface, without any fixed limits.

Figure 7:
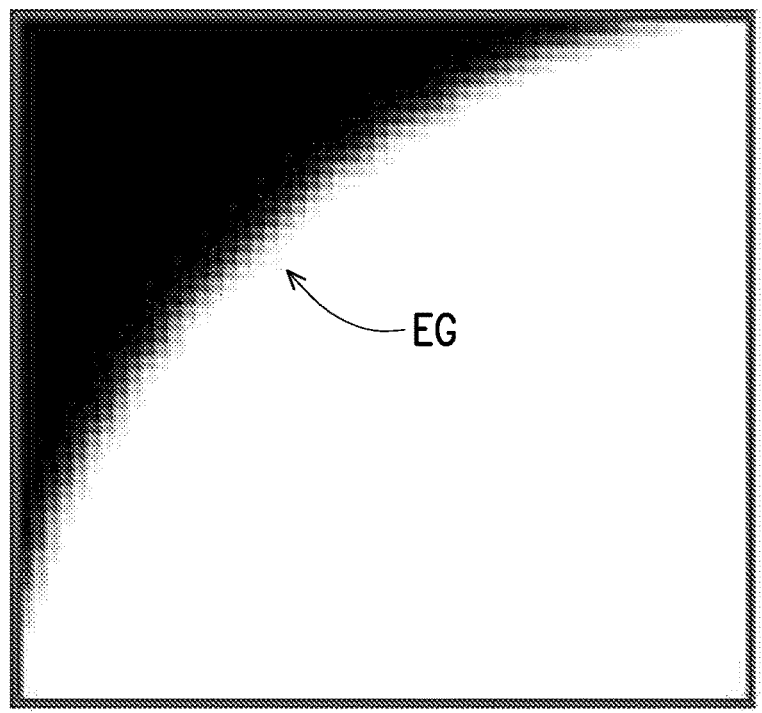
FIG. 7 illustrates a schematic view of an anti-aliased display image of an exemplary embodiment of the invention.

Referring to FIG. 7, FIG. 7 illustrates a schematic view of an anti-aliased display image of an exemplary embodiment of the invention, wherein on an edge EG of the arc-shape of the anti-aliased display image 700, a serrated phenomenon thereof is clearly eliminated, and effectively improves the display quality thereof.

Based on the above, the invention provides the anti-aliasing block for scanning the region of the image data corresponding to the arc-shape. Through the weighting values set on the anti-aliasing block, the grey level of the scanned pixel or the sub-pixel may be adjusted, thereby, effectively generating the anti-aliasing effect for a portion of the arc-shape of the display image, and optimizing the quality of the display thereof.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
a display panel having at least one arc-shape;
a processor coupled to the display panel, configured to:
    receive position and shape information of the at least one arc-shape of the display panel;
    receive a display data, adjust the display data according to the position and shape information to generate an adjusted display data;

set an anti-aliasing block on the at least one arc-shape of the display panel, wherein the anti-aliasing block has a plurality of weighting values; and scan the adjusted display data by the anti-aliasing block according to the position and shape information, and find at least one first weighting value of the plurality of weighting values corresponding to a first gray level, and find at least one second weighting value of the plurality of weighting values corresponding to a second gray level, operate an arithmetic operation by a gray level of a scanned pixel or a scanned sub-pixel with the at least one first weighting value or the at least one second weighting value to generate an operation result, and adjust the gray level of the scanned pixel or the scanned sub-pixel according to the operation result.

2. The display apparatus according to claim 1, wherein the second grey level is a grey level of a first color, the first grey level is not a grey level of the first color.

3. The display apparatus according to claim 1, wherein the processor is further configured to:
set a display boundary of the display data according to the position and shape information; and
adjusting a pixel or sub-pixel grey level corresponding to outside the display boundary of the display data to the second grey level.

4. The display apparatus according to claim 1, wherein the processor is further configured to:
set a center element of the anti-aliasing block as a center weighting value, set a plurality of surrounding elements of the anti-aliasing block as a plurality of surrounding weighting values,
wherein the center weighting value is greater or not greater than the plurality of surrounding weighting values.

5. The display apparatus according to claim 4, wherein a sum of the center weighting value and the plurality of surrounding weighting values is equal to a reference value.

6. The display apparatus according to claim 1, wherein the processor is further configured to:
set a scanning region corresponding to the at least one arc-shape of the display panel according to the position and shape information; and
sequentially scan a plurality of pixels or a plurality of sub-pixels in the scanning region by the anti-aliasing block.

7. The display apparatus according to claim 1, wherein the processor is further configured to:
calculate a sum of the at least one first weighting value; and
calculate a product of the gray level of the scanned pixel or the scanned sub-pixel with the sum of the at least one first weighting value to generate the operation result.

8. The display apparatus according to claim 1, wherein the processor is further configured to:
calculate a sum of the at least one second weighting value;
calculate a difference between a reference value and the sum of the at least one second weighting value; and
calculate a product of the gray level of the scanned pixel or the scanned sub-pixel with the difference to generate the operation result.

9. The display apparatus according to claim 1, wherein a shape of the anti-aliasing block is a polygon with N sides, and N is a positive integer greater than 3.

10. The display apparatus according to claim 1, wherein the processor is further configured to receive an anti-aliasing intensity value, and set a measurement of the anti-aliasing block and the plurality of weighting values according to the anti-aliasing intensity value.

11. The display apparatus according to claim 1, wherein the display panel is a display panel of abnormity cutting.

12. An image processing method, comprising:
recording position and shape information of at least one arc-shape on a display panel;
receiving a display data, adjusting the display data according to the position and shape information of the at least one arc-shape, and generating an adjusted display data;
setting an anti-aliasing block on the at least one arc-shape of the display panel, wherein the anti-aliasing block has a plurality of elements, and each of the plurality of elements has a weighting value; and
scanning the adjusted display data by the anti-aliasing block according to the position and shape information, and finding at least one first weighting value of the plurality of weighting values corresponding to a first gray level, and finding at least one second weighting value of the plurality of weighting values corresponding to a second gray level, operating an arithmetic operation by a gray level of a scanned pixel or a scanned sub-pixel with the at least one first weighting value or the at least one second weighting value to generate an operation result, and adjusting the gray level of the scanned pixel or the scanned sub-pixel according to the operation result.

13. The image processing method according to claim 12, wherein the second grey level is a grey level of a first color, and the first grey level is not a grey level of the first color.

14. The image processing method of claim 12, further comprising:
setting a display boundary of the display data according to the position and shape information; and
adjusting a pixel or sub-pixel grey level corresponding to outside the display boundary in the display data to the second grey level.

15. The image processing method of claim 12, wherein in the step of setting an anti-aliasing block on the at least one arc-shape of the display panel further comprises:
setting a center element of the anti-aliasing block to have a center weighting value, setting a plurality of surrounding elements of the anti-aliasing block to respectively have a surrounding weighting value, the plurality of surrounding elements surround the center element,
wherein the center weighting value is greater or not greater than the plurality of surrounding weighting values.

16. The image processing method according to claim 15, wherein the anti-aliasing block is set, wherein a sum of the center weighting value and the plurality of surrounding weighting values is equal to a reference value.

17. The image processing method of claim 12, wherein the step of scanning the adjusted display data by the anti-aliasing block according to the position and shape information, comprises:
setting a scanning region corresponding to the at least one arc-shape of the display panel according to the position and shape information; and
sequentially scanning a plurality of pixels or a plurality of sub-pixels in the scanning region by the anti-aliasing block.

18. The image processing method of claim 12, wherein operating the arithmetic operation by the grey level of the scanned pixel or the scanned sub-pixel with the at least one first weighting value or the at least one second weighting value to generate the operation result, and the step of adjusting the grey level of the scanned pixel or the scanned sub-pixel according to the operation result, comprises:

calculating a sum of the at least one first weighting value; and calculating a product of the gray level of the scanned pixel or the scanned sub-pixel with the sum of the at least one first weighting value to generate the operation result.

19. The image processing method of claim 12, wherein operating the arithmetic operation by the grey level of the scanned pixel or the scanned sub-pixel with the at least one first weighting value or the at least one second weighting value to generate the operation result, and the step of adjusting the grey level of the scanned pixel or the scanned sub-pixel according to the operation result, comprises:

calculating a sum of the at least one second weighting value;

calculating a difference between a reference value and the sum of the at least one second weighting value; and calculating a product of the gray level of the scanned pixel or the scanned sub-pixel with the difference to generate the operation result.

20. The image processing method of claim 12, further comprising: receiving an anti-aliasing intensity value, and setting a measurement of the anti-aliasing block and the plurality of weighting values according to the anti-aliasing intensity value.

21. The image processing method of claim 12, wherein the display panel is a display panel of abnormity cutting.

* * * * *